United States Patent
Chen

(10) Patent No.: US 6,524,025 B2
(45) Date of Patent: Feb. 25, 2003

(54) MEANS FOR LINEARLY CONNECTING TWO NON-CIRCULAR PIPES

(75) Inventor: Henry Chen, Taipei (TW)

(73) Assignee: Protrend Co., Ltd., Taipei (TW)

( * ) Notice: Subject to any disclaimer, the term of this patent is extended or adjusted under 35 U.S.C. 154(b) by 5 days.

(21) Appl. No.: 09/799,384

(22) Filed: Feb. 27, 2001

(65) Prior Publication Data

US 2002/0118999 A1 Aug. 29, 2002

(51) Int. Cl.$^7$ ................................................. F16D 1/00
(52) U.S. Cl. ..................... 403/286; 403/408.1; 411/389
(58) Field of Search .................. 403/286, 300–302, 403/315, 316, 13, 14, 341, 353, 408.1; 248/159; 411/384, 389

(56) References Cited

U.S. PATENT DOCUMENTS

| | | | | | |
|---|---|---|---|---|---|
| 164,420 A | * | 6/1875 | Brandeis | ...................... | 248/159 |
| 1,741,720 A | * | 12/1929 | Jolley | ......................... | 403/286 |
| 3,893,776 A | * | 7/1975 | Beattie | .................... | 403/261 X |
| 4,673,240 A | * | 6/1987 | Byfield, Jr. | ............. | 411/389 X |
| 4,690,365 A | * | 9/1987 | Miller et al. | ......... | 403/408.1 X |

FOREIGN PATENT DOCUMENTS

DE          37 28 758 C1 * 12/1988 .................. 411/389

* cited by examiner

*Primary Examiner*—Greg Binda
(74) *Attorney, Agent, or Firm*—W. Wayne Liauh

(57) ABSTRACT

A means for linearly connecting two non-circular pipes mainly includes a bar, upper and lower pads put around the bar, and a collar. The bar has two externally threaded ends adapted to screw into internally threaded holes preformed in the non-circular pipes. The upper and lower pads respectively have a cross section the same as that of a bore of the non-circular pipes, and are divided into an inner section and an outer section by a flange, such that the outer sections of said upper and said lower pads can be inserted into the pipes to synchronously rotate along with the pipes. The collar has cross section and outer diameter the same as that of the pipes and is initially put around the inner section of the upper pad, so that the collar can be downward moved to enclose the inner sections of the upper and the lower pads at the same time to confine them and accordingly the two pipes to a vertically aligned position.

4 Claims, 4 Drawing Sheets

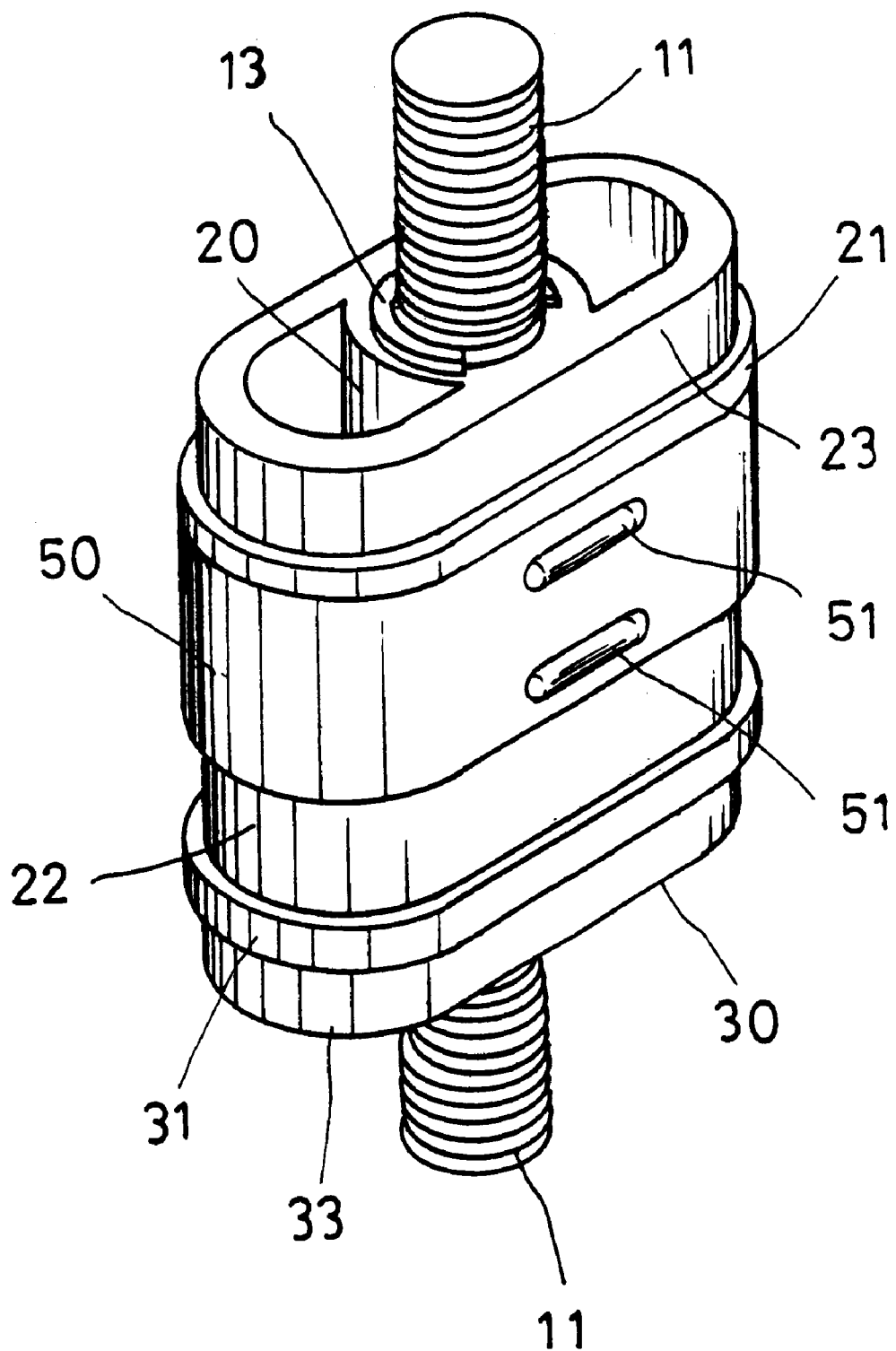
FIG·2

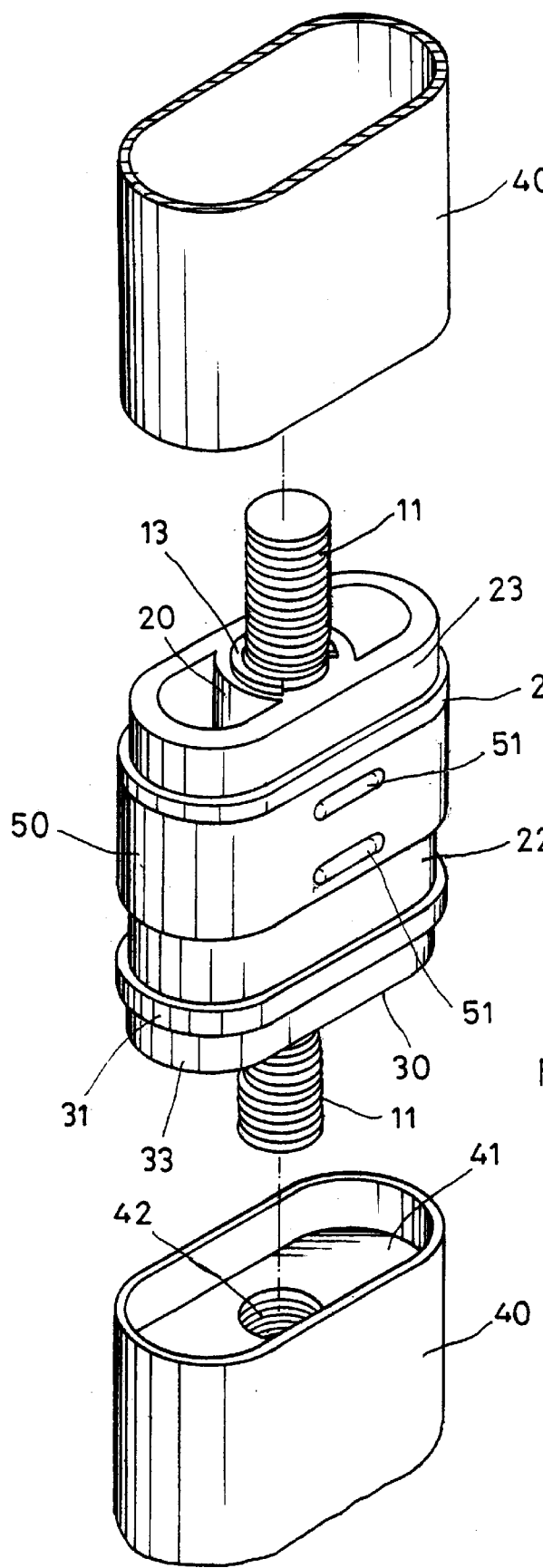
FIG·3

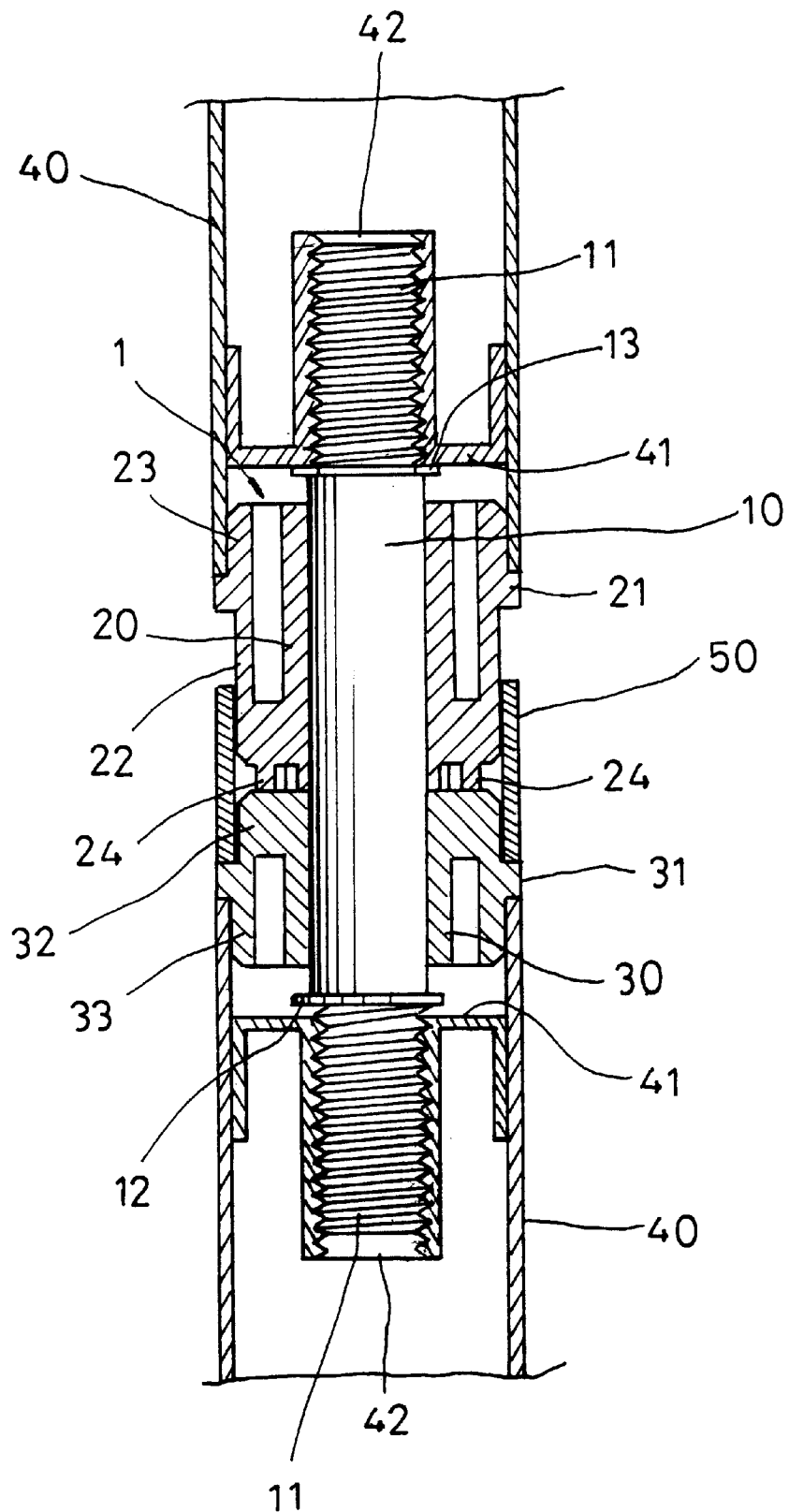
FIG·4

MEANS FOR LINEARLY CONNECTING TWO NON-CIRCULAR PIPES

BACKGROUND OF THE INVENTION

The present invention relates to a means for linearly connecting two non-circular pipes together, so that the two connected pipes are vertically aligned with each other.

A sectional rack that can be assembled and erected without the need of any tool is most welcomed by consumers. Such sectional rack usually includes many tubular members as its posts, and these tubular members are provided with a plurality of spaced annular grooves, making the posts looked like bamboo poles. U.S. Pat. Nos. 5,676,263; 5,303,645; 5,174,676; 4,991,725; 4,799,818; 4,595,107; 5,546,887; and 4,763,799 all disclose sectional racks using such bamboo pole-like tubular members as the posts of the rack.

To facilitate convenient packaging of components of such sectional rack, each of the posts is usually designed to include two or more short sections that could be linearly connected to provide a long post, giving the sectional rack an increased height, as disclosed in U.S. Pat. No. 5,676,263. Among the currently commercially available sectional racks, the posts all are made of round tubular members. A connecting member disclosed in U.S. Pat. No. 5,676,263 is suitable for connecting such round posts but not non-circular posts. When the connecting member of U.S. Pat. No. 5,676,263 is used to connect two non-circular posts for a sectional rack, upper and lower posts are not necessarily aligned with each other.

SUMMARY OF THE INVENTION

A primary object of the present invention is to provide a means for linearly connecting two non-circular pipes, such as non-circular posts for the sectional racks, so that two non-circular pipes could be connected to vertically align with each other, giving the sectional rack even, straight and beautiful posts.

To achieve the above and other objects, the connecting means of the present invention mainly includes a bar, upper and lower pads put around the bar, and a collar. The bar has two externally threaded ends adapted to screw into internally threaded holes preformed in the non-circular pipes. The upper and lower pads respectively have a cross section the same as that of a bore of the non-circular pipes, such that they can be inserted into the pipes to synchronously rotate along with the pipes. The collar has cross section and outer diameter the same as that of the pipes and is initially put around an inner end portion of the upper pad, so that the collar can be downward moved to enclose inner end portions of the upper and the lower pads at the same time to confine them accordingly the pipes to a vertically aligned position.

In the means of the present invention for linearly connecting two non-circular pipes, the upper and the lower pads are respectively divided into an inner section and an outer section by a flange. An outer diameter of the pads at the flange is the same as that of the pipes.

To enable the means of the present invention to linearly connect two non-circular pipes together, the pipes are separately provided in their each end with an insertion member on which an internally threaded holes is formed for the externally threaded ends of the bar to screw thereinto.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 2 is an assembled perspective of the connecting means of FIG. 1;

FIG. 3 is an exploded perspective showing the connection of two non-circular pipes with the means of the present invention; and FIG. 4 is a fragmentary sectioned view of the means of the present invention with two non-circular pipes connected to two ends thereof.

DETAILED DESCRIPTION OF THE PREFERRED EMBODIMENTS

Figure 1:
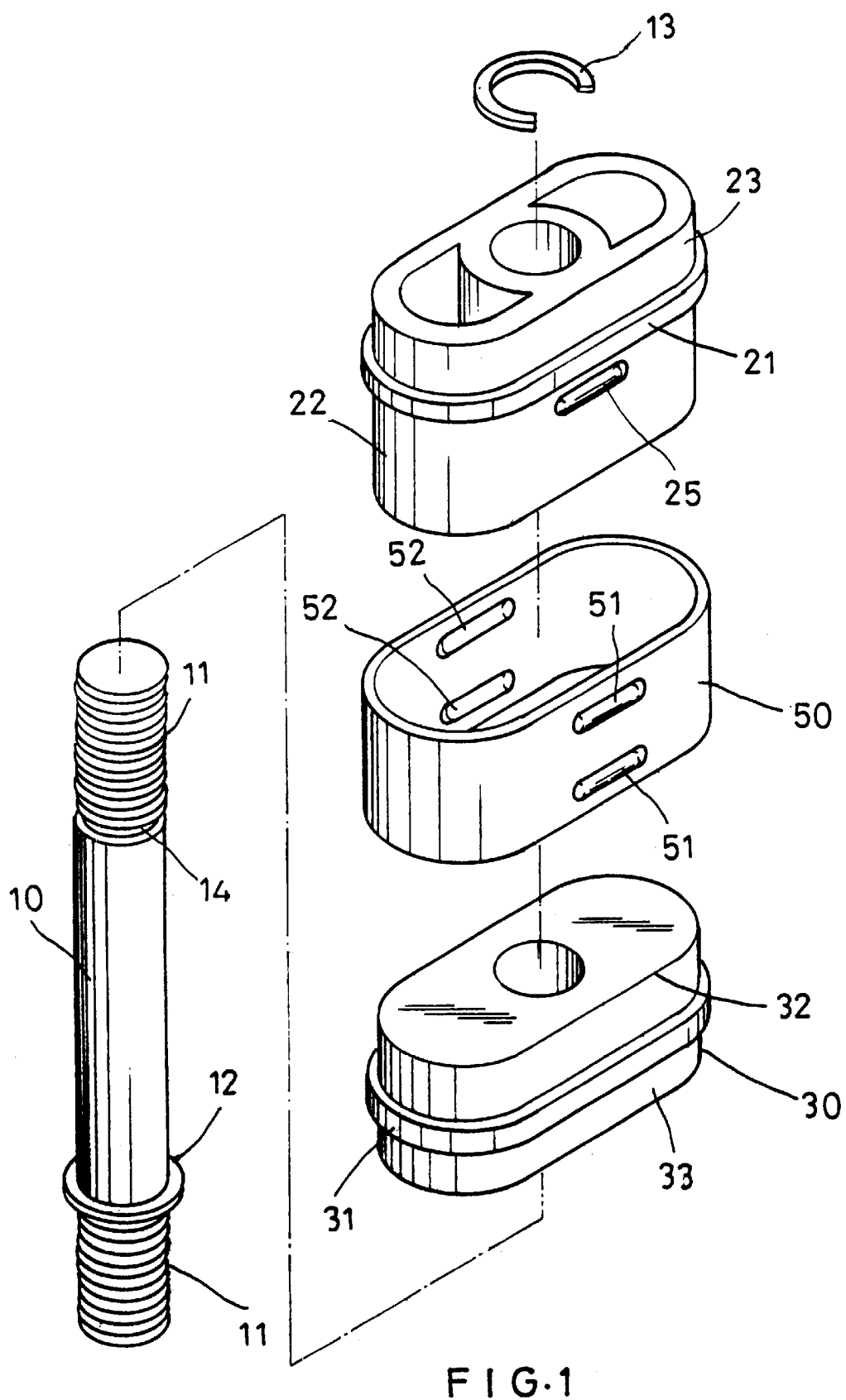
FIG. 1 is an exploded perspective of a means for linearly connecting two non-circular pipes according to the present invention.

Please refer to FIGS. 1 through 4 in which a means 1 for linearly connecting two non-circular pipes 40 is shown. The means 1 mainly includes a bar 10 having two externally threaded ends 11 adapted to screw into internally threaded holes 42 preformed in the non-circular pipes 40 to be linearly connected, an upper and a lower pad 20, 30 put around the bar 10, and a collar 50 for aligning the upper and the lower pads 20, 30 with each other.

The upper and the lower pads 20, 30 respectively have a cross section having shape and dimensions the same as that of a bore of the non-circular pipes 40, and a flange 21, 31 dividing the upper and the lower pads 20, 30 into an inner section 22, 32 and an outer section 23, 33. An outer diameter of the upper and the lower pads 20, 30 at the flange 21, 31 is identical to that of the non-circular pipes 40. Whereby, the pads 20, 30 are adapted to insert their outer sections 23, 33 into the pipes 40 to synchronously rotate along with the pipes 40.

The collar 50 has cross section and outer diameter the same as that of the pipes 40 and is put around the inner sections 22, 32 of the upper and the lower pads 20, 30 to confine them to a vertically aligned position. And, the collar 50 is initially put around the inner section 22 of the upper pad 20.

The upper and the lower pads 20, 30 are prevented from separating from the bar 10 via two free ends thereof by two stoppers 12, 13. The stopper 12 is integrally formed on the bar 10 corresponding to the lower pad 30, and the other stopper 13 may be an elastic C-ring set into an annular groove 14 provided on the bar 10 corresponding to the upper pad 20.

The pipes 40 are non-circular pipes as shown in FIG. 3. Each of the pipes 40 is provided in each end with an insertion member 41 defining an internally threaded hole 42 thereon for engaging with the two externally threaded ends 11 of the bar 10 to connect the means 1 to the pipes 40.

To linearly connect two non-circular pipes 40 together with the means 1, first screw two externally threaded ends 11 of the bar 10 into the internally threaded holes 42 provided in the ends of the two pipes 40 facing each other. Then, slide the upper and the lower pads 20, 30 along the bar 10 in opposite directions to insert their outer sections 23, 33 into the ends of the two pipes 40 separately screwed to two ends of the bar 10, so that the pads 20, 30 could be rotated along with the pipes 40 synchronously. When the inner sections 22, 32 of the pads 20, 30 are brought to tightly press against one another when the two pipes 40 are rotated against the threaded ends 11 of the bar 10, it means the pipes 40 have been fully tightened to the bar 10. At this point, the two pipes 40 are not necessarily vertically aligned with each other. To align them with each other, the two pipes 40 are slightly loosened from the threaded ends 11 of the bar 10 to vertically align with each other while the pads 20, 30 still press against each other. At this point, the collar 50 that is initially put around the inner section 22 of the upper pad 20 is moved downward to enclose only a part of the inner section 22 of the upper pad 20 and the entire inner section 32 of the lower pad 30, locating the two pads 20, 30 in place and confining the two pipes 40 to a vertically aligned position, as shown in FIG. 4. In practical operation, the collar 50 is initially put around the upper pad 20 and then moved downward to enclose the inner sections 22, 32 of the upper and the lower pads 20, 30 at the same time, so that the collar 50, under the action of the force of gravity, would not automatically move upward after it has been moved downward.

As can be seen from FIG. 4, one of the two pads, for example, the upper pad 20, is provided at an end surface of the inner section 22 with two or more forward extended equal-height feet 24 to reduce a frictional force between the two inner sections 22, 32 when the pads 20, 30 are tightly pressed against each other.

As can be seen from FIG. 1, the collar 50 is provided preferably at two longer walls with at least one outward projected rib 51 each to facilitate holding of the collar 50 by an operator at the ribs 51. The outward projected ribs 51 form corresponding recesses 52 on inner wall surfaces of the collar 50, and the upper pad 20 is provided on two longer outer wall surfaces with two ribs 25 adapted to engage into two uppermost recesses 52 for the upper pad 20 to conveniently attach to and locate in the collar 50 without easily separating from the collar 50. To enable the collar 50 to enclose the upper and the lower pads 20, 30 at the same time, the collar 50 has a height equal to that of the inner section 22 of the upper pad 20 and larger than a total height of the inner section 30 of the lower pad 30 and the feet 24.

The connecting means of the present invention has simple structure and can be easily operated to linearly align and connect two non-circular pipes to each other, allowing all non-circular tubular members to have increased commercial value and provide consumers with more choices in the posts for a sectional rack.

What is claimed is:

1. A means for linearly connecting two non-circular pipes, comprising:

a bar having two externally threaded ends adapted to screw into internally threaded holes preformed in said non-circular pipes;

an upper and a lower pad put around said bar and respectively having a cross section the same as that of a bore of said non-circular pipes and being divided into an inner section and an outer section by a flange, an outer diameter of said upper and said lower pads at said flange being identical to that of said non-circular pipes, and the outer sections of said upper and said lower pads being adapted to insert into said pipes to synchronously rotate along with said pipes; and a collar having cross section and outer diameter the same as that of said pipes and being initially put around said inner section of said upper pad, said collar being downward movable to enclose said inner sections of said upper and said lower pads at the same time to confine said upper and said lower pads to a vertically aligned position.

2. The means for linearly connecting two non-circular pipes as claimed in claim 1, further comprising two stoppers provided on said bar to prevent said upper and said lower pads from separating from said bar.

3. The means for linearly connecting two non-circular pipes as claimed in claim 1, wherein said internally threaded holes preformed in said non-circular pipes are separately provided on an insertion member pre-fitted in each end of said pipes.

4. The means for linearly connecting two non-circular pipes as claimed in claim 1, wherein one of said upper and said lower pads is provided at an end surface of said inner section with two or more equal-height and forward extended feet.

* * * * *